United States Patent [19]

Urbas et al.

[11] Patent Number: 5,262,772
[45] Date of Patent: Nov. 16, 1993

[54] TRANSPONDER SCANNER

[75] Inventors: Donald J. Urbas, Evergreen; Cornelia A. O'Neill, Boulder, both of Colo.

[73] Assignee: Bio Medic Data Systems, Inc., Maywood, N.J.

[21] Appl. No.: 616,476

[22] Filed: Nov. 21, 1990

Related U.S. Application Data

[62] Division of Ser. No. 394,469, Aug. 16, 1989, abandoned.

[51] Int. Cl.$^5$ .................................................. H04Q 1/00
[52] U.S. Cl. ........................... 340/825.54; 340/825.55; 340/825.69
[58] Field of Search ............... 340/825.54, 825.69, 340/825.72, 825.55, 825.15, 825.3, 825.35, 573; 128/737

[56] References Cited

U.S. PATENT DOCUMENTS

| | | |
|---|---|---|
| 3,752,960 | 8/1973 | Walton . |
| 4,087,791 | 5/1978 | Lemberger . |
| 4,161,737 | 7/1979 | Albright . |
| 4,229,743 | 10/1980 | Vo et al. . |
| 4,333,072 | 6/1982 | Beigel ............... 340/825.54 |
| 4,473,825 | 9/1985 | Walton ............... 340/825.54 |
| 4,526,177 | 7/1985 | Rudy et al. . |
| 4,888,585 | 12/1989 | Kamiya et al. . |
| 5,008,661 | 4/1991 | Raj .................... 340/825.55 |

Primary Examiner—Donald J. Yusko
Assistant Examiner—Brian Zimmerman
Attorney, Agent, or Firm—Blum Kaplan

[57] ABSTRACT

A transponder scanner for scanning a passive transponder within a high noise environment has a housing. A ferrite rod is positioned within the housing. A high gauge thin wire is wound about the ferrite rod to form a magnetic coil so that adjacent coils of the magnetic coil are separated by a distance much greater than the diameter of the magnetic wire. A CPU receives the scanned signal corresponding to a preprogrammed code and an in house generated code and maps the preprogrammed code to the in house generated code.

6 Claims, 3 Drawing Sheets

TRANSPONDER SCANNER

This is a division of application Ser. No. 07/394,469, filed on Aug. 16, 1989 now abandoned.

BACKGROUND OF THE INVENTION

This invention is directed to an antenna and, in particular, to an antenna for scanning a passive transponder utilized in a system for identifying animals.

Transponder scanners are known in the art. These transponder scanners utilize an antenna to transmit and receive signals from a passive transponder. One such use is a transponder embedded in an animal. The antenna includes a ferrite bar having a thick gauge cable densely wound about the ferrite bar. The antenna transmits a 400 KHz signal which is received by the transponder embedded in the animal and returns a signal of 40 KHz and 50 KHz. This signal is coded in accordance with a combination of 40 KHz and 50 KHz portions of the transmitted signal to correspond to a preprogrammed ID number stored in the passive transponder's chip. The ID number is preprogrammed at the time of manufacture. This ID number allows identification of the animal in which the transponder is embedded. The scanner then inputs this coded ID number into a microcomputer for processing. The prior art transponder scanners are by necessity also bulky in size having large circular shapes to accommodate the thick wires.

These prior art scanners have been less than completely satisfactory because of background noise interference. The television monitoring screen or computer CRTs used in conjunction with the microprocessors which are used during scanning also operate at a 40 KHz and 50 KHz RF signal. There is very little shielding on such monitors. These monitors have a high power output and, accordingly, they interfere with the operation of the scanner when the scanner is used in the proximity of computers and other various monitors. Additionally, the large size of the prior art scanners prevented the scanning of animals within the animal's habitat in that the scanner was unable to fit within the animal cage. Accordingly, it became necessary to remove each animal in order to be scanned.

Furthermore, ID numbers are used as a shorthand manner for presenting data concerning the animal. However, the system user must use the preprogrammed ID number to identify the test animal. This requires the user to match his animal information to the preassigned transponder ID number resulting in an increase of time and effort.

Therefore, a transponder scanner for scanning passive transponders operating at the 40 KHz and 50 KHz frequency signal range, which may be utilized within the animal habitat and in the proximity of the microcomputers necessary for monitoring such animals and mapping the scanned code into a useable in house code, is provided by the instant invention.

SUMMARY OF THE INVENTION

Generally speaking, in accordance with the instant invention, a highly tuned antenna for use with a passive transponder is provided. A ferrite rod is provided. An extremely thin high gauge solid core magnet wire is wound about the rod so substantially all of the windings are separated from each adjacent winding by a distance substantially equal to three times the wire diameter. The antenna is formed as an elongated rod so the transponder itself may be formed as an elongated cylinder having a general "wand" shape.

In one embodiment of the transponder scanner the wire is wound about the ferrite rod approximately ninety times. The first five to ten windings are packed tightly together so that there is substantially no space between adjacent windings.

An FSK demodulator receives the ID number and translates the ID number into a machine usable signal. A CPU 144 receives the signal detected by the transponder scanner and maps a user identification code to the manufacturer preprogrammed encoded code so that the user may assign the identification he wishes to each particular animal. The in house user identification code is then transmitted to a display or may be utilized by the system user with affiliated CPUS.

Accordingly, it is an object of the instant invention to provide an improved transponder scanner for use with passive transponders.

A further object of the invention is to provide a primary coil antenna for a transponder scanner that reduces the sensitivity to background RF noise levels that would effect its ability to receive coded RF signals from a passive transponder.

Another object of the instant invention is to provide a primary coil design antenna for a transponder scanner that minimizes sensitivity to general RF noise without affecting its specific sensitivity to coded return signals while minimizing blind spots for the antenna.

Yet another object of the instant invention is to provide a transponder scanner which allows scanning of animals within a cage environment.

Still another object of the invention is to provide a transponder scanner which allows scanning of the transponder in a manner parallel to the transponder to maximize transponder readability.

Yet another object of the invention is to provide a system in which a preprogrammed ID number may be automatically mapped into an in house generated ID number once the ID has been originally input into the system.

Still other objects and advantages of the invention will in part be obvious and will in part be apparent from the specification.

The invention accordingly comprises the features of construction, combination of elements, and arrangement of parts to be exemplified by the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
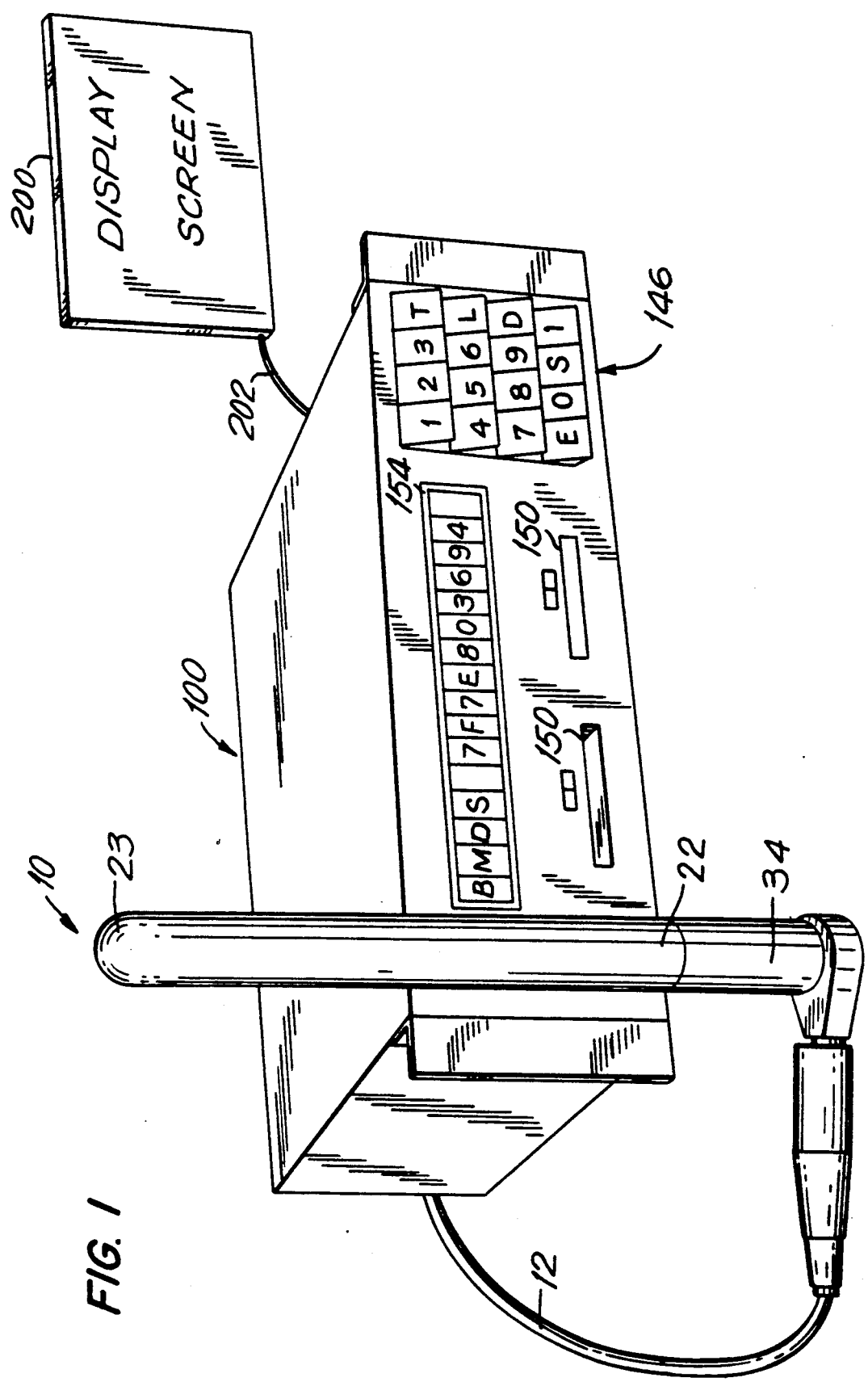
FIG. 1 is a perspective view of a system utilizing a transponder scanner constructed in accordance with the invention.

Generally speaking, in accordance with the instant invention, a transponder scanner, generally indicated at 10, is utilized for scanning and detecting a passive transponder embedded in an animal to be scanned. Scanner 10 is used in conjunction with a microcomputer, generally indicated as 100, coupled to scanner 10 by a cable 12, and a display screen, generally indicated as 200 coupled to microcomputer 100 by a cable 202.

A passive transponder, which includes a programmed chip and an inductive coil, is embedded in an animal for identification purposes. As will be discussed in greater detail below, scanner 10 outputs a 400 KHz signal which through mutual inductance induces energy into the transponder. The transponder divides the energy frequency and radiates a coded RF signal which is FSK coded including a pattern made of 40 KHz and 50 KHz signals in accordance with a preprogrammed ID number of the passive transponders chip. This information is then received by the scanner 10, transmitted through cable 12 to microcomputer 100, where it is processed and corresponding information is displayed on display screen 200.

Figure 2:
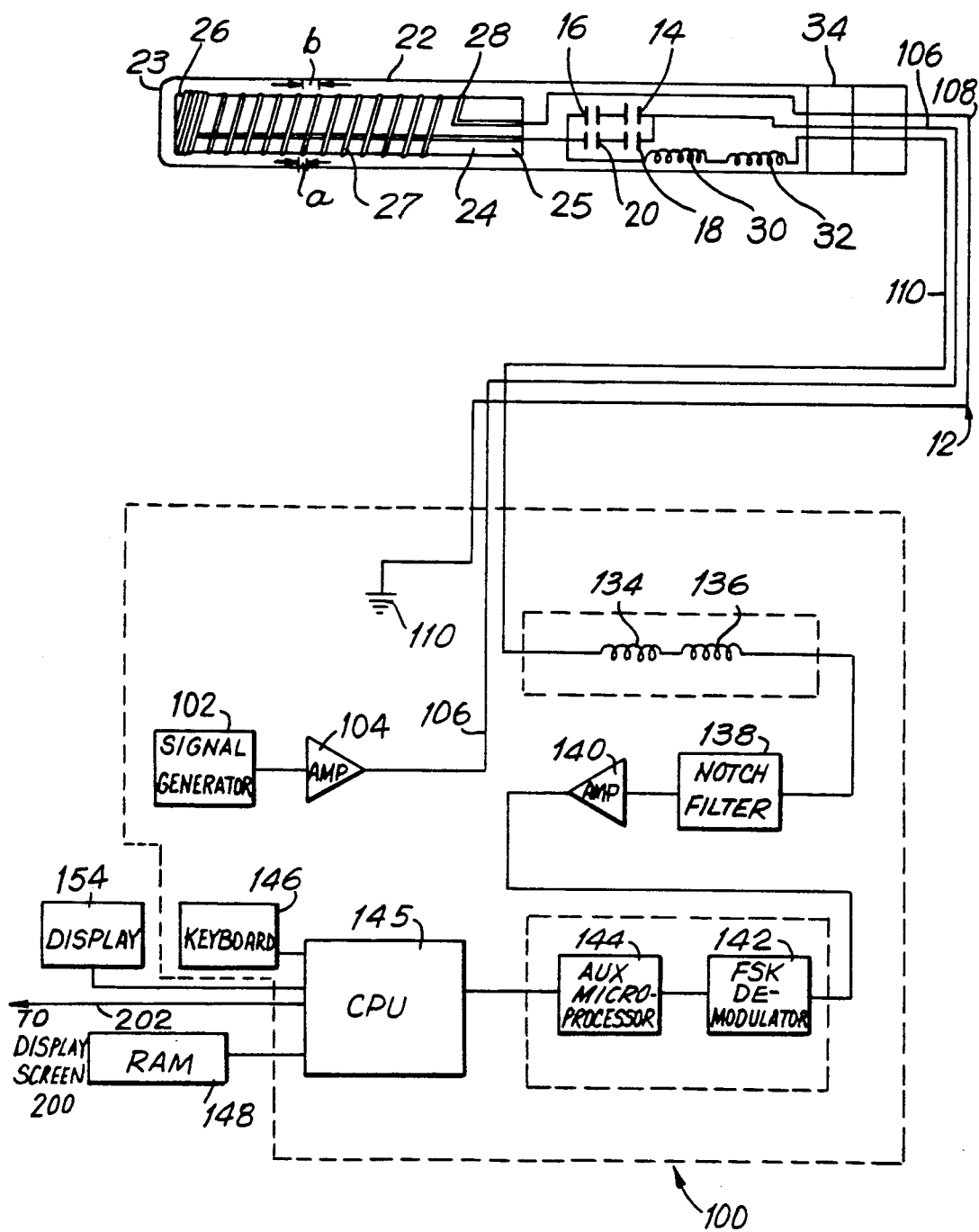
FIG. 2 is a block diagram of the scanner and system of FIG. 1.

Reference is now also made to FIG. 2 in which the operation of transponder scanner 10 is provided. A signal generator 102 contained within microcomputer 100 generates a 400 KHz reference signal. The output signal is amplified by amplifier 104 and transmitted to scanner 10 along a line 106 contained within cable 12. Scanner 10 has a housing 22 formed as a closed end cylinder. Within housing 22 is supported an LC circuit. The LC circuit includes a capacitor pair 14,16 connected in series and a capacitor pair 18,20 connected in series and also in parallel with capacitors 14,16. Capacitor 14 and capacitor 18 of each respective capacitor pair receive the 400 kHz signal input from line 106.

A ferrite rod 24 is positioned within a distal end 23 of housing 22. Ferrite rod 24 is provided with a near end 25 adjacent the LC circuit and a distal end 26. A wire 27 is wound about ferrite rod 24 to form a magnet coil 28. One end of coil 28 is coupled to capacitors 16,20 and the other end of coil 28 is coupled to a ground by a line 108.

Because ferrite rod 24 acts as an inductor, the entire circuitry of the antenna forms a large LC circuit having a high Q at 400 KHz. Accordingly, the 400 KHz signal input along line 106 passes through capacitors 14-20 boosting the voltage so that a high voltage 400 KHz signal is provided.

Four capacitors are utilized to step up the voltage in this embodiment due to the high amount of voltage provided at the distal end of ferrite rod 24. A 40 volt signal is produced along line 106 which is increased to 600 to 700 volts through capacitor 16-18 and transmitted to the tip of scanner 10. However, when looking at the capacitors in either direction, they may be considered as a single capacitor capable of such a voltage step up. As described above, the 400 KHz signal is converted to a 40 KHz and 50 KHz coded signal by the passive transponder chip embedded in the animal. Coil wire 27 has a wire diameter a. Each adjacent winding of magnetic coil 28 is separated by distance b, substantially equivalent to three times diameter a of wire 27. The use of a ferrite rod aids in the inductive coupling of the individual coils in magnetic coil 28 without the need for close proximity. The coil is thus tuned to resonate at 400 KHz. The spacing effect allows for the creation of a broader flux profile than would normally be obtained by the prior art close winding method. This broad field maximizes energy coupling with the passive transponder.

The 400 KHz signal is output to the passive transponder contained within the animal. The passive transponders coil receives the RF energy transmitted by scanner 10 and sends out a coded RF signal having a 40 KHz and 50 KHz characteristic which is FSK coded to a preprogrammed ID number by the chip contained within the transponder. However, this is also the frequency used to drive display screen 200. Because display screen 200 is an active emitter providing a stronger signal than the passive transponder, the background 40 KHz, 50 KHz signal would prevent accurate recording of the transponder produced signal. Wire 27 of coil 28 is made of a thin gauge which minimizes scanner 10's sensitivity to generalized RF noise, such as that emanating from display screen 200, without affecting the specific sensitivity to the coded transponder produced signal.

At distal end 26 of ferrite rod 25 the coils of magnetic coil 28 are disposed with no space therebetween. In an exemplary embodiment the first five coils are tightly packed and are increasingly spaced apart until about the tenth coil which is spaced substantially three times its diameter from the eleventh coil. Such a coil configuration prevents blind spots when scanning at a 45° angle.

In an exemplary embodiment, the primary antenna formed by magnetic coil 28 and ferrite rod 25 utilizes a 4 inch long ferrite rod having a ⅛ inch diameter, having a 125 $\mu$H permeability rating. A 30 gauge magnet wire is tightly wound around the ferrite rod, approximately forty five times along 2.25 inches of the ferrite ride beginning at the distal end. The number of windings can change depending on the ferrite rod diameter the permeability of the ferrite rod and the values of capacitors 14, 16, 18 and 20. A space of 0.04 inches is provided between adjacent coils of magnetic coil 28, except at the coil's tip where spacing is reduced to zero.

A first inductor 30 and a second inductor 32 are connected in series between the connection between capacitor 20 and magnetic coil 28 and a line 110 of cable 12. Because ferrite rod 25 and magnetic coil 28 are part of the LC circuit, there is a 400 KHz signal naturally remaining within the circuit. Accordingly, inductors 30,32 act as a low band pass filter to screen the 400 KHz signal remaining within the circuit from the 40 KHz, 50 KHz signal received by magnetic coil 28. This filtered signal is then transmitted along line 110 to a third inductor 134 in series with a fourth inductor 136 which act as a second low band pass signal for filtering out high frequency signals on the line.

The secondary filtered signal is then transmitted to a notch filter 138 which filters background noise from the signal so that primarily the 40 KHZ, 50 KHZ signal remains. The remaining signal is then amplified by an amplifier 140. The amplified signal is input to an FSK demodulator 142 which senses the FSK coded signal and, in conjunction with auxiliary microprocessor 144, translates the FSK coded signal into a machine usable signal. The machine usable signal is transmitted to a CPU 144. CPU 144 receives the data detected by scanner 10 and manipulates the data in accordance with input from a keyboard 146 mounted at the outside of microcomputer 100. For example, the data may be stored on RAM cards 148 which are received within slots 150 of microcomputer 100. The data may also be transmitted through cable 202 to a display screen 200 or to display 154 located on microprocessor 100.

Figure 3:
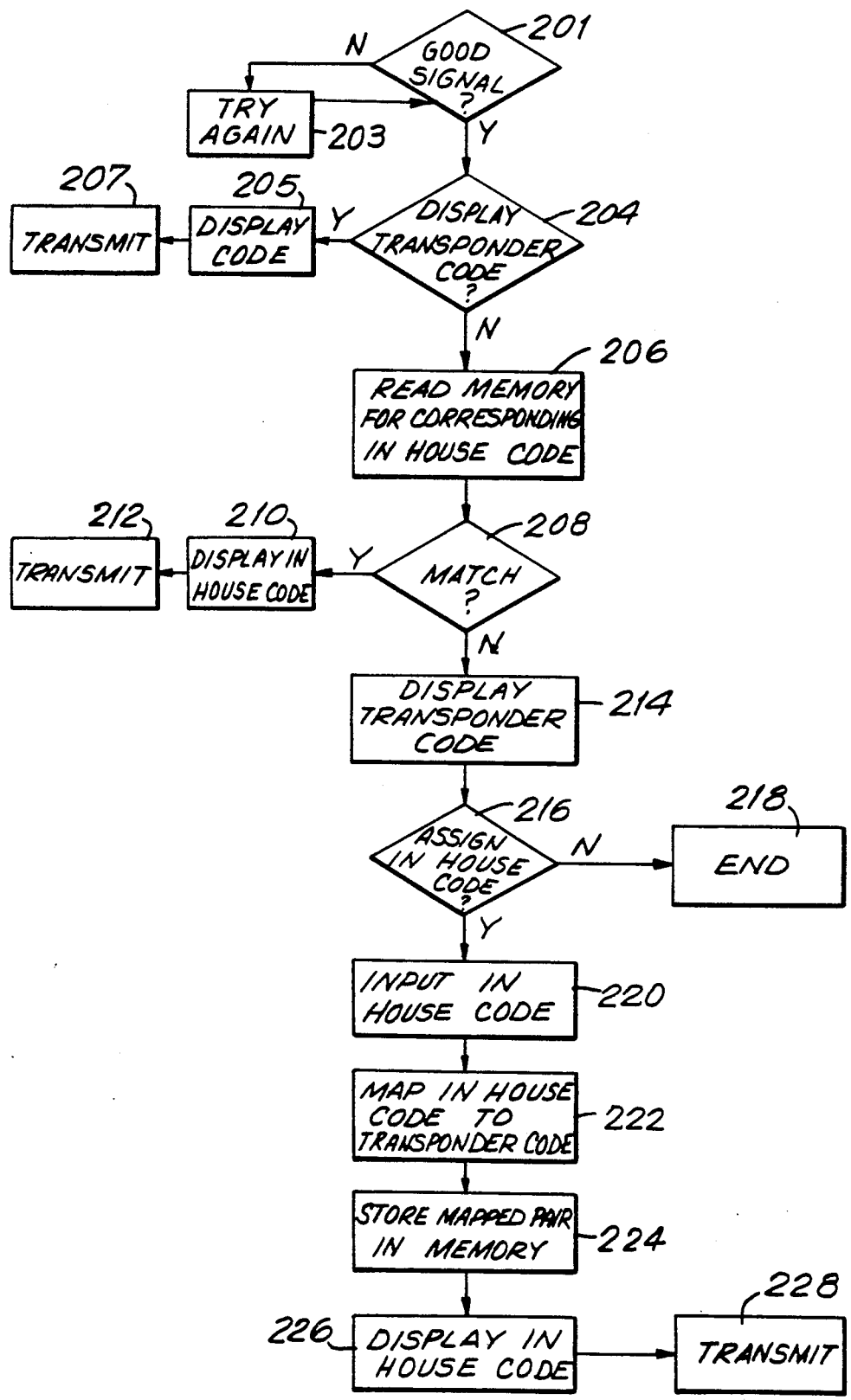
FIG. 3 is a flow chart for processing the scanned signal in accordance with the invention.

CPU 145 may perform functions such as translating the transponder stored code into a user generated code. As seen in FIG. 3 CPU 145 first determines whether or not good information has been received from scanner 10 in step 201. If good information has not been received then a different function is attempted or a scan is attempted again in a step 203. If good information is received in a step 201 it is then determined whether the transponder code as read is to be displayed at display 154 in a step 204. If it is decided to display the transponder code the code is displayed at display 154 in a step 205 and then the code may be transmitted to a display screen 200 or to some other CPU used in connection with microcomputer 100 for manipulating data in a step 207.

The programmed ID codes are stored on RAM cards 148. During animal scanning, when an in house code is to be used RAM cards 148 are inserted in slot 150 to provide a necessary data base of previously entered in house codes and their corresponding transponder codes. Accordingly, if it is decided that the display transponder code is not to be displayed then the memory RAM cards 148 are read for the corresponding in house code in a step 206. In a step 208 it is determined whether a match has been found between the input transponder code and the in house codes stored in the memory in a step 208. If a match is found the in house code is displayed at display 154 in a step 210. The transponder code may also be displayed along with the in house code at the option of the user based upon an input from key board 146. Once the information has been displayed at display 154 it may then be transmitted to display screen 200 or some other peripheral CPU for more detailed manipulation of the data corresponding to the scanned animal in a step 212. As a default, if no match is found in a step 208, the transponder code will be displayed at display 154 automatically in a step 214 and this transponder code may also be transmitted to the display screen 200 and to the peripheral CPU associated with the display screen as in step 208.

When no match is found between the transponder read code and the in house codes already stored in the memory then the user at his option may input an in house code. In a step 216 if the user does not wish to assign an in house code during this operation then the processing ends as the transponder code has already been displayed in a step 218. If the user wishes to assign an in house code then utilizing keyboard 146 an in house code, having the same number of characters as display 154, is input in a step 220. In an exemplary embodiment display 154 may display up to a 16 character code or message. This newly input in house code is then mapped to the transponder code to form a code pair in a step 222. This mapped pair is then stored in a memory such as RAM cards 148 in a step 224. The newly entered in house code is then displayed at display 154 in a step 226. Again the transponder code may also be displayed at this time in accordance with the instructions of the user. This in house code is now transmitted along line 202 to display screen 200 or the associated CPU in accordance with a step 228 resulting in identification of a scanned animal by a user generated in house code.

Study has shown that compared with a primary antenna utilizing a magnetic coil ferrite construction having closely coupled windings of 20 gauge wire, the coil constructed utilizing a thinner wire with each winding spaced apart from another by distance substantially three times the wire diameter, the antenna performs 100% better in a high noise environment such as the noise produced by computer CRT scanning frequencies. Additionally, by providing the signal generating electronics within the housing of the microcomputer, the signal generator noise is shielded by the microcomputer housing from the scanner. Accordingly, one more source of noise is removed from the scanning environment. If the signal generating electronics were placed within the housing of the scanner, it becomes necessary to provide shielding in the housing so that the scanner would not detect itself resulting in a larger, bulkier, more complicated scanner which is not adaptable for simple easy use within a cage environment.

Housing 22, including the circuitry within it, is detachably connected to cable 12 through a connector 134. Connector 134 may be formed of any connection which allows electrical contact between the lines of cable 12 and the circuitry of the LC circuit housed within housing 22. Such a coupling may be a male/female plug or the like. This feature is also facilitated by the positioning of the signal generating electronics within the microcomputer. This provides more adaptability in that any type of transmitting receiving antenna may be coupled to cable 12 and a 400 KHz signal which would cause a response in the embedded transponder would still be produced. If the signal generating circuitry was shared between microcomputer 100 and housing 22, then it would require removal of all the signal generating apparatus, including that internal to the microprocessor each time the antenna was changed. If the signal generating apparatus were within the housing, it would require that only antennas having a 400 KHz frequency be connected to cable 12 limiting the variety of antennas which can be utilized.

Transponder readability is maximized when the transponder is positioned parallel to the scanner. By providing a scanner within a hollow cylinder having a generally "wand" shape, it becomes easier to orient the animal being scanned in parallel with the scanner. Additionally, it becomes easier to position the scanner within the animal environment or cage due to its less bulky design.

By providing a transponder scanner utilized with passive transponders embedded in animals utilizing thin gauge wire wound about a ferrite rod in which each coil is spaced from an adjacent coil by a distance three times the diameter of the wire, the unit's cross-section receiving surface to background noise is reduced while maintaining a flux field size typical of higher gauge coil designs. The scanner may then be used in high background noise areas, such as in conjunction with a computer CRT or television monitor. By winding the distal end of the magnetic coil tightly, relative to the remainder of the coil, blind spots which occur when the scanning occurs at 45, relative to the transponder are substantially removed. By providing a signal generator at a point removed from the scanner, additional shielding is provided. Additionally, by placing the remaining circuitry in a wand shaped housing, a less complicated, more manageable scanner is provided. By providing an interconnection between the leads connecting the scanner to a microprocessor, the entire system becomes more adaptable for use with a variety of scanners.

By providing a CPU capable of receiving an in house code input and a scan transponder code input and mapping the two, a system for studying animals in which the animal is automatically identified by an in house code is provided. Additionally, by storing the mapped code pairs on a RAM card a portable memory is provided.

It will thus be seen that the objects set forth above, among those made apparent from the preceding description, are efficiently attained and, since certain changes may be made in the above construction without departing from the spirit and the scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A scanner for use in scanning passive transponders utilizing an LC circuit comprising a housing; antenna means for transmitting and receiving a signal including a ferrite rod supported within said housing, a magnetic coil defined by a wire wound about said ferrite rod to form a plurality of coils, the antenna means receiving a preprogrammed ID number from said scanned transponder; input means for generating a user selected in house ID number; mapping means for generating an in house ID number in response to said input means and for mapping said preprogrammed ID number to said in house ID number to form a mapped pair; display means for receiving said in house generated ID number and displaying said in house ID number; and processing means for processing said in house ID number when data representative of said preprogrammed ID number is received.

2. The scanner of claim 1, further comprising memory means for storing a map table corresponding to the mapping of said in house generated ID number and the corresponding preprogrammed ID number.

3. The scanner of claim 2, further comprising a housing wherein said mapping means and memory means are mounted within said housing, said memory means being removable from said housing.

4. The scanner of claim 3, wherein said memory means includes an RAM card.

5. An apparatus for scanning a passive transponder comprising antenna means for transmitting a signal and receiving a signal from said transponder corresponding to a preprogrammed ID number of said transponder;
input means for generating a user selected in house ID number;
mapping means for mapping said preprogrammed ID number to said in house generated ID number in response to said input means;
display means for receiving said in house generated ID number and displaying said in house generated ID number; and
memory means for storing said in house generated ID number and corresponding transponder ID number as a mapped pair.

6. The apparatus for scanning of claim 5, wherein said memory means may be removed from said apparatus.

* * * * *